US009805440B2

(12) United States Patent
Chen et al.

(10) Patent No.: US 9,805,440 B2
(45) Date of Patent: Oct. 31, 2017

(54) METHOD AND APPARATUS TO IMPROVE PERFORMANCE OF CHAINED TASKS ON A GRAPHICS PROCESSING UNIT

(71) Applicants: INTEL CORPORATION, Santa Clara, CA (US); Weike Chen, Beijing (CN); Li-An Tang, El Dorado Hills, CA (US); Guei-Yuan Lueh, San Jose, CA (US); Hao Yuan, Beijing (CN); Samuel Hsu, Santa Clara, CA (US)

(72) Inventors: Weike Chen, Beijing (CN); Li-An Tang, El Dorado Hills, CA (US); Guei-Yuan Lueh, San Jose, CA (US); Hao Yuan, Beijing (CN); Samuel Hsu, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/025,901

(22) PCT Filed: Nov. 22, 2013

(86) PCT No.: PCT/CN2013/087664
§ 371 (c)(1),
(2) Date: Mar. 30, 2016

(87) PCT Pub. No.: WO2015/074239
PCT Pub. Date: May 28, 2015

(65) Prior Publication Data
US 2016/0217549 A1 Jul. 28, 2016

(51) Int. Cl.
*G06T 1/00* (2006.01)
*G06T 1/20* (2006.01)
*G06F 9/50* (2006.01)

(52) U.S. Cl.
CPC .............. *G06T 1/20* (2013.01); *G06F 9/5016* (2013.01); *G06T 2200/28* (2013.01)

(58) Field of Classification Search
None
See application file for complete search history.

(56) References Cited

U.S. PATENT DOCUMENTS

2003/0172195 A1    9/2003  Jonkers
2011/0115802 A1*   5/2011  Mantor ................. G06F 9/5027
                                                       345/520

(Continued)

FOREIGN PATENT DOCUMENTS

CN    102541640    4/2012
CN    102609978    7/2012

OTHER PUBLICATIONS

International Searching Authority, "Notification of Transmittal of the International Search Report and the Written Opinion of the International Searching Authority," dated Aug. 13, 2014, in International application No. PCT/CN2013/087664.

*Primary Examiner* — Martin Mushambo
(74) *Attorney, Agent, or Firm* — Trop, Pruner & Hu, P.C.

(57) ABSTRACT

In an embodiment, at least one computer readable storage medium has instructions stored thereon for causing a system to send, from a processor to a task execution device, a first call to execute a first subroutine of a set of chained subroutines. The first subroutine may have a first subroutine output argument that includes a first token to indicate that first output data from execution of the first subroutine is intermediate data of the set of chained subroutines. The instructions are also for causing the system, responsive to inclusion of the first token in the first subroutine output argument, to enable the processor to execute one or more operations (Continued)

while the task execution device executes the first subroutine. Other embodiments are described and claimed.

20 Claims, 8 Drawing Sheets

(56) References Cited

U.S. PATENT DOCUMENTS

2013/0194286 A1* 8/2013 Bourd ................ G06F 9/544
            345/545
2015/0178879 A1* 6/2015 Palmer ................ G06F 9/505
            345/506

* cited by examiner

METHOD AND APPARATUS TO IMPROVE PERFORMANCE OF CHAINED TASKS ON A GRAPHICS PROCESSING UNIT

TECHNICAL FIELD

Embodiments pertain to improvement of performance of chained tasks on a graphics processing unit (GPU).

BACKGROUND

A video algorithm can often be broken down to a series of simple basic algorithms. For example, an edge detection algorithm can be broken down to 'convolve', 'add', etc. A video accelerator library may accelerate these basic algorithms when executed on a graphics processing unit (GPU).

At least two factors can affect performance when one GPU task is broken down into many GPU tasks. A first factor is overhead associated with data transference between the GPU and a host processor. A second factor is overhead associated with setup of the GPU tasks. For example, a single GPU task needs one setup. After the task is broken down to several tasks (although each task is very small), each GPU task needs to be set up. Each factor can result in increased latency associated with task performance.

DETAILED DESCRIPTION

Figure 1:
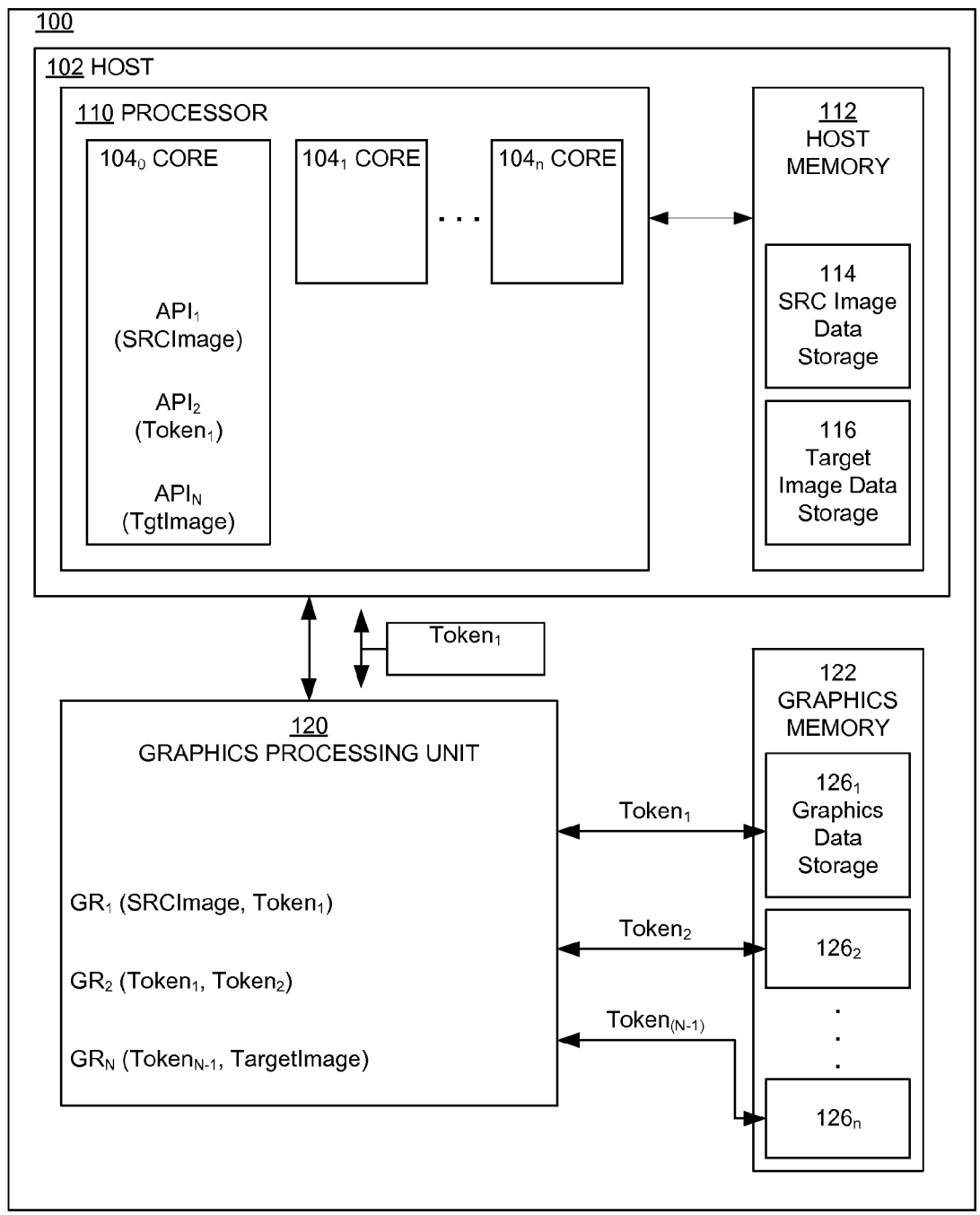
FIG. 1 is a block diagram of a system, according to an embodiment of the present invention.

According to embodiments of the present invention, execution of chained instructions may be enhanced by a reduction of data transfer overhead between a task execution unit, such as a GPU, and a processor of a host. According to embodiments of the present invention, the execution of the chained instructions may be further enhanced by execution of GPU setup overhead while execution of graphics algorithms is being conducted.

For example, the operations of crop and overlay are two operations of some graphics algorithms, e.g., crop a sub-image from a first image, and then paste (overlay) this sub-image into a second image. Application programming interfaces (APIs) to be executed by the processor of a host that is coupled to the GPU may be as follows: crop (srcImage, . . . , subImage); overlay (subImage, . . . , targetImage). Initially, the source image may be copied from a host memory to a graphics memory. Secondly, a host processor may set up the running context for the crop, e.g., determine setup parameters needed by the GPU to run a crop graphics subroutine called by the crop API. Then the host issues the crop task to the GPU to execute, and the host waits for the GPU to complete the crop task. When the crop task (e.g., subroutine) is finished, the host typically copies the sub-image from the graphics memory to the host memory.

The host prepares the data for the overlay task including copying the sub-image to the graphics memory, and copying the target image to the graphics memory. The host sets up running context for the overlay. The host issues the overlay task to the GPU to run and the host waits for the GPU task to be completed. The overlay task run finishes, and the host copies the target image to the host memory.

In the foregoing example, the output of the crop task is the input of the overlay task, and the copying of the sub-image between the GPU and the host processor is unnecessary, since the sub-image is an intermediate result. Loss of efficiency also results from the processor being idle while the GPU is busy.

According to an embodiment of the present invention, one or more tokens (or handles) may be defined that can be used to identify the intermediate results in order to reduce the data transfer between the host processor and GPU, and to indicate to the processor that the processor can execute instructions while the GPU is performing a task. For example, the basic APIs may be modified to crop (srcImage, . . . , token1); overlay (token1, . . . , targetImage). Token1 may be an identifier to indicate that intermediate data is stored in a portion of the graphics memory. When crop is called with 'token1' as the sub-image parameter, the host sees that the output is a token (e.g., indication of intermediate data), and so the host does not copy the output back to the host (system) memory. In some embodiments, token1 can also identify a portion of graphics memory in which output is to be stored.

The host does not have to wait for the crop GPU task to be completed before the host does the setup work for the next GPU task (e.g., 'overlay'). The host processor may set up an overlay running context while the GPU executes the crop task, e.g., the host processor sets up the overlay running context in parallel with the GPU execution of the crop task. Any two GPU tasks are executed serially, and so the crop task is complete before the 'overlay' task runs on the GPU.

When the 'overlay' API is executed by the processor, the processor recognizes that the input parameter of the 'overlay' task is a token, and so the processor does not copy sub-image data from the host memory to the graphics memory. Rather, because the input argument is a token, the sub-image is already in graphics memory coupled to the GPU.

Benefits of the procedure described above may include:
1. The sub-image is not copied back to the host, which reduces the data transfer between the GPU and the host processor.
2. The GPU and the host processor can work in parallel, so that while GPU is busy executing the 'crop' subroutine, the set-up for 'overlay' can be executed in the host processor.

In another example, edge detection is an algorithm that includes basic operations such as convolve, square, add, etc. In order to implement the edge detection algorithm, a sequence of subroutine calls to be executed may be as shown in Table I.

TABLE I

EDGE DETECTION

GaussianLPF (src, width, height, token1)
Subsample (token1, width, height, token2)
Convolve (token2, . . . , token3)
Convolve (token2, . . . , token4)
Square (token3, . . . , token5)
Square (token4, . . . , token6)
Add (token5, token6, . . . , token7)
SQRT (token7, . . . , token8)
Convolve (token8, . . . , token9)
Binarize (token9, . . . , token10)
Crop (token10, . . . , token11)
Crop (token10, . . . , token12)
Crop (token10, . . . , token13)
Xor_Image (token11, token12, . . . , token14)
Xor_Image (token11, token13, . . . , token15)
Or_Image (token14, token15, . . . , image)

Most of the subroutine calls of the edge detection algorithm, e.g., all except for an initial subroutine call GaussianLPF (src, width, height, token1) and a final subroutine call OR_Image (token14, token15, . . . , image), may be executed without transfer of data between the host processor and the GPU. Each intermediate result may be stored in the GPU memory. The tokens are indicative of the intermediate results. If the output of the subroutine call is a host pointer, e.g., instead of a token, the processor waits for the data to be output by GPU in order to complete execution of the next API instruction. For example, the processor waits for the data from the GPU subroutine call before completion of a final API instruction. In the example of Table I, at the final subroutine call of the edge detection algorithm, Or_image (token14, token15, . . . , image), the processor waits for all GPU tasks to complete because the processor needs the GPU output 'image.'

Regarding subroutine call inputs, if the input is a token no data will be transferred between the processor and the GPU. If the input is a host pointer, the data will be transferred to the GPU memory from the host processor, e.g., retrieved from a host memory.

In the edge detection algorithm of Table I, if the output of a subroutine call is a token, the subroutine call can be executed as an asynchronous intermediate call, e.g., the subroutine call can be executed in parallel with host processor execution of a setup of a next subroutine call. Thus, while GPU is executing the tasks, the host processor may work in parallel ("asynchronous pipeline") to set up one or more unexecuted tasks for the GPU, until the last call. The asynchronous pipeline may be broken when the output parameter of the GPU subroutine call includes a host pointer. The subroutine is executed by the GPU and returns output data to the host processor, and the processor waits for the GPU to complete the subroutine before completing a final API.

Use of tokens to reduce data transfer, and execution of a subroutine call by the GPU in parallel with execution of one or more other operations by a host processor, may also be also applied in other platforms, e.g., to reduce data transference and to invoke parallel processing by the processor and another task execution device.

FIG. 1 is a block diagram of a system 100, according to an embodiment of the present invention. The system 100 includes a host 102 that includes a processor 110 and a host memory 112. The system 100 also includes a graphics processing unit (GPU) 120 and a graphics memory 122. The processor 110 may include one or more cores $104_0$, $104_1$, . . . $104_n$. The processor 110 may be coupled to the host memory 112. The processor 110 may also be coupled to the GPU 120. The GPU 120 may be coupled to the graphics memory 122.

In operation, the core $104_0$ may execute a plurality of application program interfaces (API) including $API_1$, . . . $API_N$. Each API may have one or more arguments. For example, $API_1$(SRCImage) may perform an operation on a source image data, e.g., retrieval of the source image data from a source image data storage 114 in the host memory 112. $API_2$ may include an argument 'Token1,' and may include a subroutine call $GR_1$ (SRCImage, Token1), for which the source image data is to be provided to the GPU 120 by, e.g. the core $104_0$. Argument 'Token1' may indicate that output of $GR_1$ (SRCImage, Token1) is not to be returned to the processor 110. Instead, the output of $GR_1$ (SRCImage, Token1) is to be stored in graphics data storage portion $126_1$ of the graphics memory 122. Each API that has a token in its result argument and that calls a subroutine call $GR_i$ to the GPU 120 may result in execution by the GPU 120 of the subroutine call $GR_i$ and storage of the output of $GR_i$ in the graphics memory 122, e.g., in a graphics data storage portion $126_i$ (i=1 to n) associated with the token, (e.g., Token1, Token2, etc.). The subroutine $GR_i$, having a token in its output argument, may not return output data to the processor.

An API (e.g., $API_N$) may have an argument such as 'TargetImage' (target image) and may prompt the GPU 120 to execute a subroutine call, e.g., $GR_N$ (Token$_N$, TargetImage), and to return the result to the processor. Output argument 'TargetImage' may thus be a host pointer that indicates that the output of $GR_N$ is to be sent to the (host) processor 110.

As each subroutine call with a token in the respective output argument is sent to the GPU 120, because the processor 110 is not waiting for the output data from the subroutine call being executed, the processor 110 may process setup operations that are associated with another GPU subroutine call to be made, e.g., an immediately subsequent subroutine call for which setup parameters may be determined prior to execution by the GPU. Thus, the processor can execute setup operations associated with a second subroutine call $GR_2$ in parallel with the GPU 120 execution of the first subroutine call $GR_1$ that has a respective token in its output argument.

It is to be noted that in other embodiments, the GPU may be included within the processor. Also, in some embodiments, the graphics memory may be a portion of system memory. For example, the host memory and the graphics memory may be portions of shared memory within the system memory.

Figure 2:
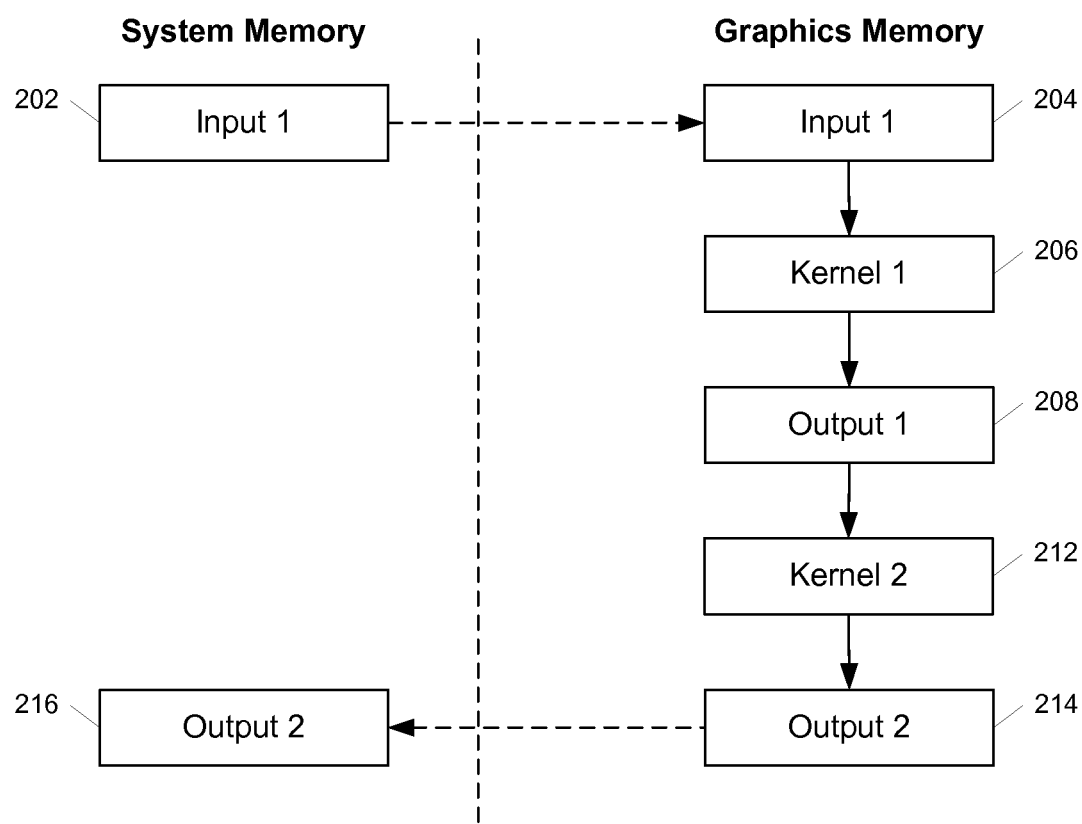
FIG. 2 is a scheme to process chained instructions by a processor coupled to a graphics processing unit (GPU), according to an embodiment of the present invention.

Turning to FIG. 2, shown is a scheme to process data by a processor coupled to a GPU, according to an embodiment of the present invention. At 202, Input 1 (e.g., image data) is stored in system memory. Moving to block 204, the Input 1 is transferred to graphics memory. Advancing to block 206, Kernal 1, which includes one or more operations to accomplish a task to be completed by the GPU and has an output argument that includes a token ('Token1'), operates on the Input 1 stored in the graphics memory and outputs Output 1 (block 208) to the graphics memory. Output 1 data is not transferred to the system (host) memory because of Token1 in the output argument.

Continuing to block 212, Kernal 2, which has Token1 as an input argument, operates on the Output 1 stored in the graphics memory and outputs Output 2 (block 214). There is no token associated with Output 2; rather a pointer in an output argument of kernel 2 may indicate that the Output 2 data is to be returned to the system memory via a host processor. Proceeding to block 216, Output 2 is transferred to the host processor and stored in the system memory.

Figure 3:
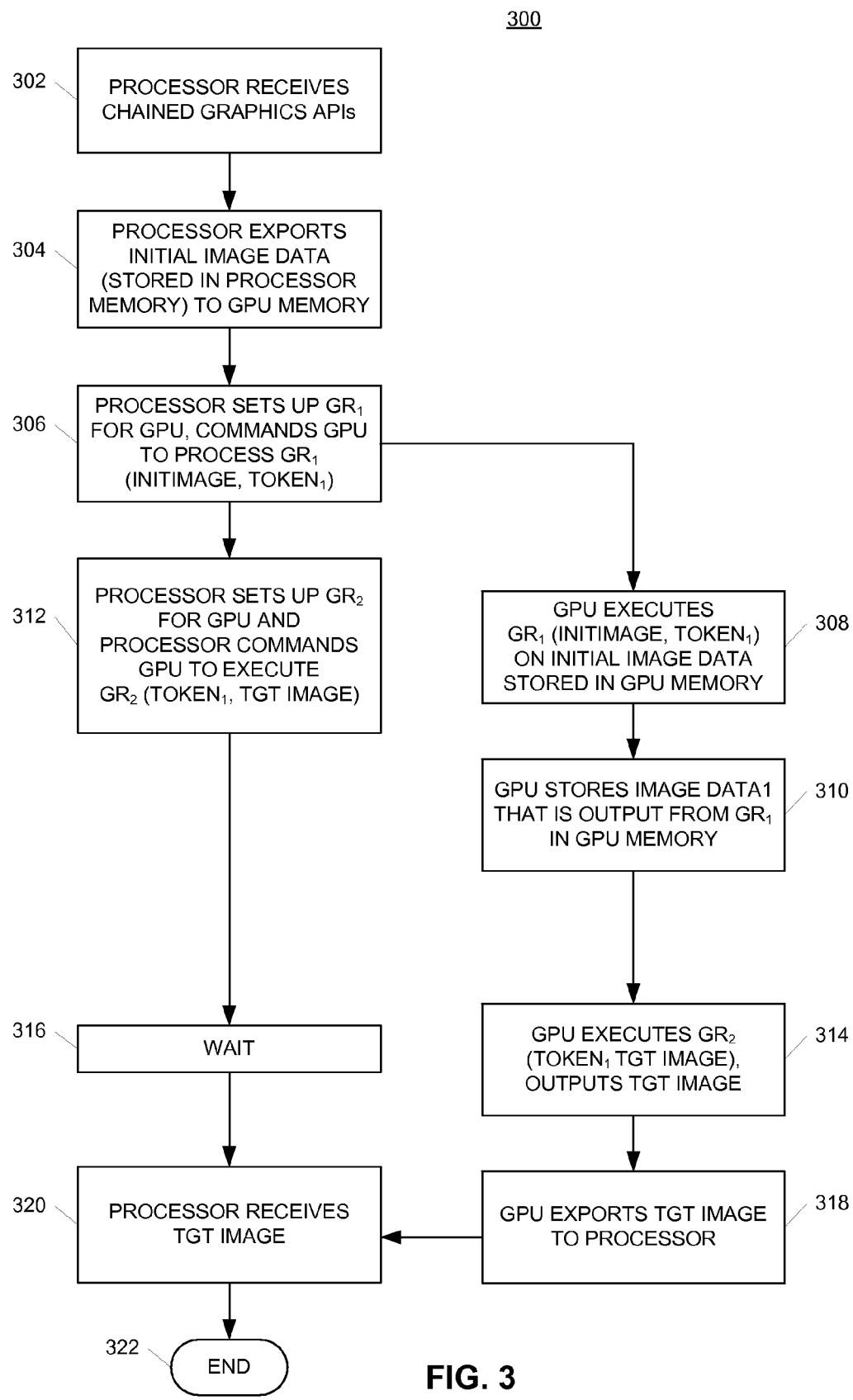
FIG. 3 is a flow chart of a method of processing chained instructions in a system, according to an embodiment of the present invention.

FIG. 3 is a flow chart of a method 300 of processing data in a system that includes a processor (e.g., host processor) and another device, e.g., a task execution device such as a GPU, according to an embodiment of the present invention. At block 302 the processor receives chained APIs, e.g., chained graphics APIs. In a set of chained APIs output of an API may serve as input to a subsequent API. Continuing to block 304, the processor executes $API_1$ and exports initial image data (e.g., stored in a host memory) to a GPU memory. Advancing to block 306, the processor sets up parameters to process subroutine $GR_1$ by the GPU. Moving to block 308, the GPU executes $GR_1$ on the initial image data stored in the GPU memory. Proceeding from block 308 to block 310, the GPU stores, in the GPU memory, image data1 that is output from execution of $GR_1$.

While the GPU executes $GR_1$, at block 312 the (host) processor executes an $API_2$, which has input argument token1 and output argument 'tgtimage'. $API_2$ calls subroutine a $GR_2$ (token1, tgtimage), which has the output argument 'tgtimage'. While the GPU executes $GR_1$ (blocks 308 and 310) the processor executes operations to set up $GR_2$ and requests execution of $GR_2$ by the GPU. The host processor can set up $GR_2$ while $GR_1$ is being processed because the host processor is not waiting for output data from $GR_1$, since $API_2$ has an input argument ('token1') that indicates that there is no input data (e.g., the output of $GR_1$) needed by the processor.

Moving from block 310 to block 314, the GPU executes $GR_2$ (token1, tgtimage) on image data1 stored in the GPU memory and outputs a target image. While the GPU executes $GR_2$ (token1, tgtimage), at block 316 the host processor waits until target image data, output from execution of $GR_2$, is available from the GPU.

The GPU outputs the target image to the host processor at block 318. Proceeding to block 320 the processor receives target image from the GPU. The method ends at 322.

In method 300, each API that has a token in its output argument (instead of a memory pointer) causes the GPU to store output data of a corresponding task in local memory (e.g., GPU memory), which may be distinct from the host memory (e.g., system memory). In the case where the output argument of the subroutine call $GR_n$ indicates a memory pointer (instead of a token), the output data is to be transferred from the GPU to the host processor, to be stored, e.g., in the host memory.

Also to be noted is that when the GPU executes a subroutine call whose output argument includes an output token (instead of a memory pointer), the processor can operate in parallel with the GPU, e.g., executing a setup for the next subroutine call, since the processor does not need to wait for results of the currently executing subroutine before processing the setup for the next subroutine call.

Figure 4:
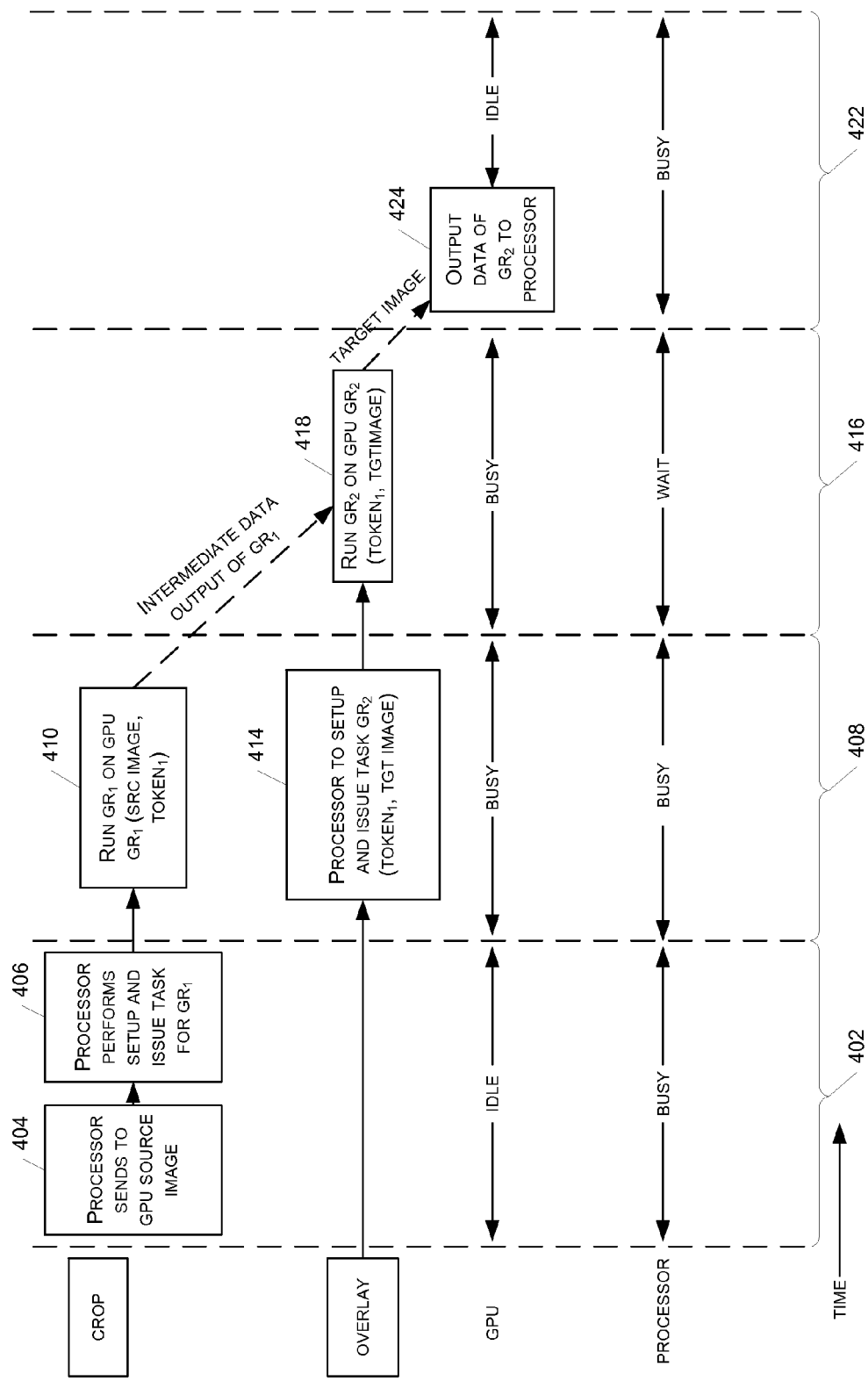
FIG. 4 is a timeline diagram according to embodiments of the present invention.

FIG. 4 is a timeline diagram according to embodiments of the present invention. During time period 402, a (host) processor sends a source image ('srcimage') to a GPU (404). The processor also performs setup and task issue (406) for a first subroutine call $GR_1$. During the time period 402 the GPU is idle.

During time period 408, the GPU is to execute (410) $GR_1$ (srcimage, token1). Token 1 in the output argument of $GR_1$ signifies that output data from $GR_1$ is to be stored in graphics memory, and is not to be passed back to the processor, which does not wait for data to be returned from the GPU. While $GR_1$ is being executed by the GPU, the processor can execute (414) a setup and issues a second subroutine call, $GR_2$(token1, tgtimage), to the GPU. The GPU outputs intermediate data indicated by an arrow from 410 to 418. The intermediate data may be input to the GPU for the second subroutine call $GR_2$. During the time period 408 the processor executes (414) setup and issue in parallel with execution (410) by the GPU of $GR_1$.

During time period 416, the GPU executes (418) the subroutine $GR_2$ (token1, tgtimage). Input argument token1 means that the input data (e.g., intermediate data) resides in GPU memory and is not requested from the host memory. Therefore, the host processor does not provide the input data to the GPU to execute $GR_2$. The output argument of $GR_2$ is a target image ('tgtimage'), and so during time period 416 the processor waits for the output of $GR_2$ before execution of additional tasks. Hence during the time period 416 the host processor does not operate in parallel with the GPU.

During a time period 422, after transfer of the output data of $GR_2$ to the processor, the GPU is idle and the processor is to copy (424) the image data received from the GPU to the host memory.

Figure 5:
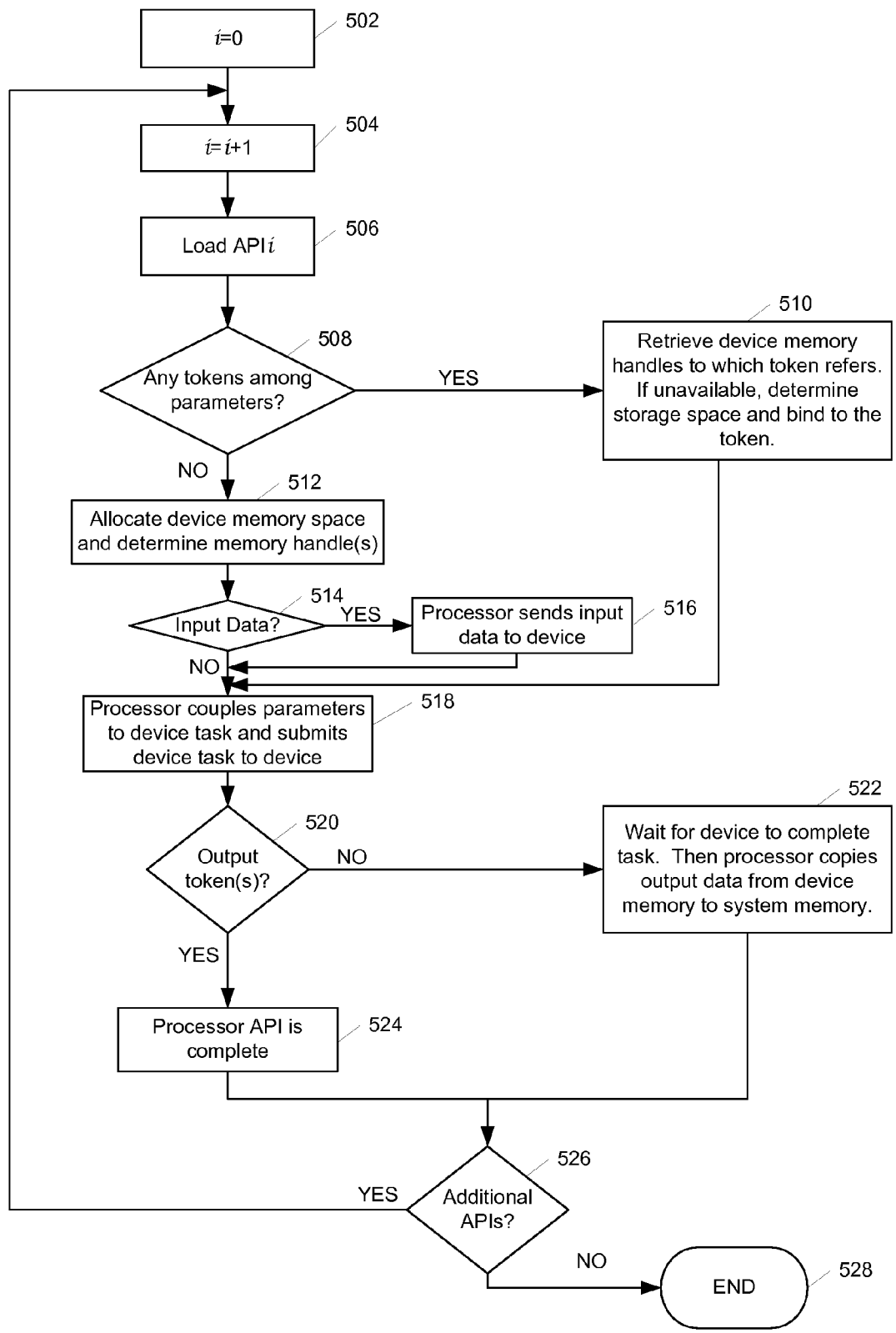
FIG. 5 is a flowchart of a method of executing chained instructions, according to an embodiment of the present invention.

FIG. 5 is a flowchart of a method 500 of executing instructions, according to an embodiment of the present invention. At block 502 an index i is initially set to zero. Continuing to block 504, the value of index i is increased by 1. Advancing to block 506, $API_i$ is loaded into a processor, e.g., a host processor of a system. Moving to decision block 508, it is determined whether there are any tokens among the parameters of $API_i$. If there are one or more tokens among the $API_i$ parameters, proceeding to block 510 device memory handle(s) associated with each token are retrieved, e.g., to direct storage of output data to an appropriate storage space, or to retrieve input data from the appropriate storage space. If the memory handles are unavailable, storage space may be determined and bound to the token. After the storage space is bound to the corresponding token, proceeding to block 518 the processor couples parameters to a device task and submits the device task to the device (e.g., GPU).

If the API parameters do not include any tokens, proceeding to block 512 device memory space (e.g., of a GPU) is allocated for storage of input data to a device (e.g., GPU) and/or output data from the device, and one or more memory handle(s) for the memory space(s) are determined. Moving to decision diamond 514, if there is input data to be provided to the device, proceeding to block 516 the processor sends the input data to the device and advances to block 518. If no input data is to be provided from the processor to the device, advancing to block 518 the processor handles preparation of the device to execute a device task, e.g., the processor couples parameters to a device task $GR_i$ associated with $API_i$ and submits the device task $GR_i$ to the device for execution on the device.

Proceeding to decision block 520, it is determined whether there are output token(s) from execution of $GR_i$. If there is an output token (e.g., indication that the output data is intermediate data to be input to a subsequent $GR_i$ for execution on the device), moving to block 524 the processor API is complete, e.g., the processor does not wait to receive data prior to completion of the $API_i$ and the output data from execution of a $GR_i$ (e.g., intermediate data) may be stored in a device memory (e.g., GPU memory coupled to the GPU) rather than being stored in system memory (e.g., host memory). The processor can begin setup for a subsequent $GR_{i+1}$ while a $GR_i$ executes on the GPU (blocks 502-518).

If there are no output tokens, proceeding from decision diamond 520 to block 522 the processor waits until the device completes the task $GR_i$, and then the processor copies the output data from the device memory and stores the output data in the system memory coupled to the processor. Continuing to decision diamond 526, if there are additional APIs to be executed, returning to block 504 the index i is incremented and the next API is loaded into the processor at block 506. If there are no additional APIs to be executed, the method ends at 528.

Figure 6:
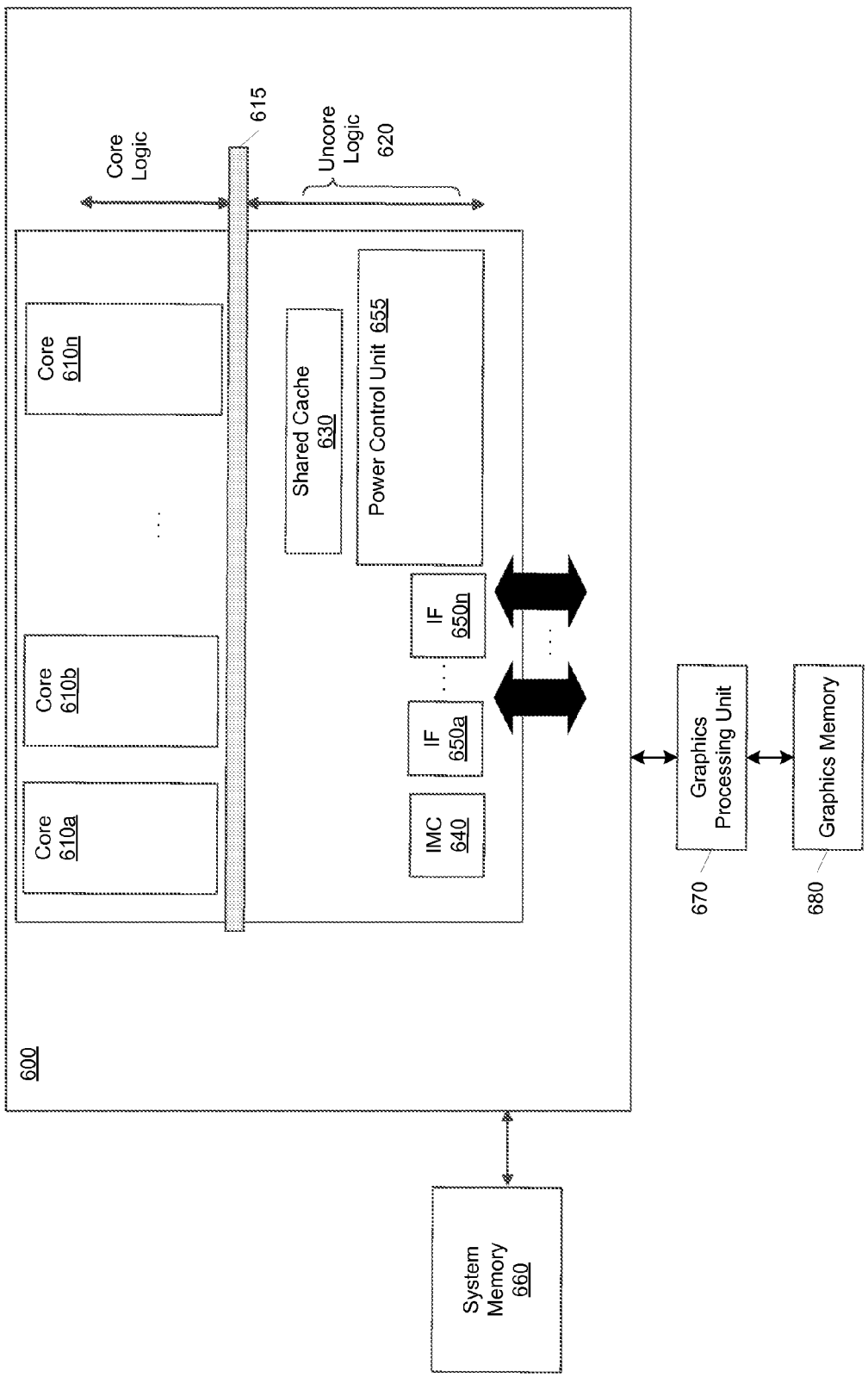
FIG. 6 is a block diagram of a processor, in accordance with an embodiment of the present invention.

Referring now to FIG. 6, shown is a block diagram of a processor, in accordance with an embodiment of the present invention. As shown in FIG. 6, processor 600 may be a multicore processor including a plurality of cores $610_a$-$610_n$. The various cores may be coupled via an interconnect 615 to a system agent or uncore 620 that may include various components. As seen, the uncore 620 may include a shared cache 630, which may be a last level cache. In addition, the uncore 620 may include an integrated memory controller 640, various interfaces 650, and a power control unit (PCU) 655. With further reference to FIG. 6, processor 600 may communicate with a system memory 660, e.g., via a memory bus. In addition, by interfaces 650, connection can be made to various off-chip components such as peripheral devices, mass storage and so forth.

The processor 600 can be coupled to a graphics processing unit (GPU) 670, which may be coupled to a graphics memory 680. In some embodiments, the graphics memory 680 is distinct from the system memory 660. In other embodiments, the graphics memory 680 and the system memory 660 are part of a shared memory. The GPU 670 may be configured to receive a task from the processor 600, execute the task, and may store intermediate data in the graphics memory 680 responsive to an output argument of the task being a token, as in embodiments of the present invention. The processor 600 may be configured to execute setup instructions associated with execution of a subsequent task by the GPU 670, the setup instructions being executed in parallel with the execution of a present task by the GPU 670, as in embodiments of the present invention. While shown with this particular implementation in the embodiment of FIG. 6, the scope of the present invention is not limited in this regard.

Figure 7:
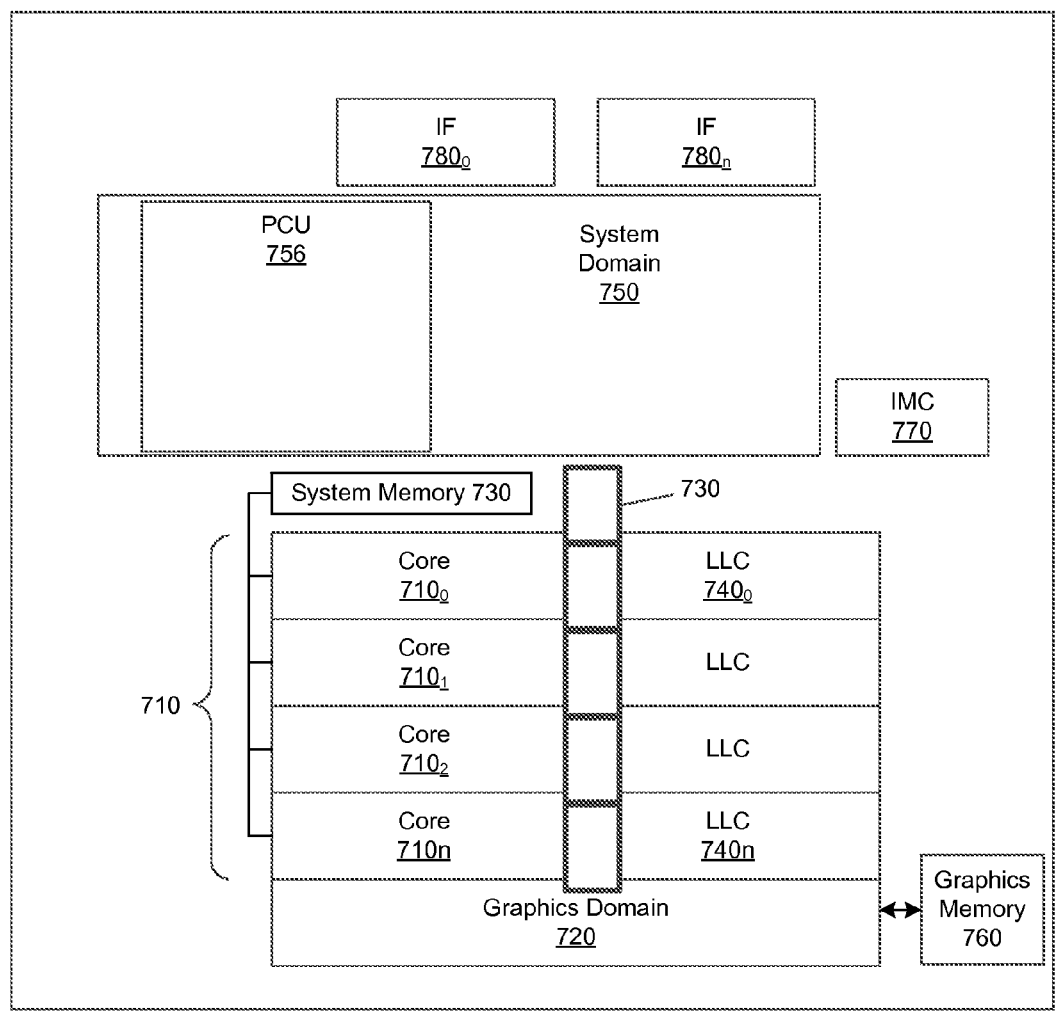
FIG. 7 is a block diagram of a multi-domain processor in accordance with another embodiment of the present invention.

Referring now to FIG. 7, shown is a block diagram of a multi-domain processor in accordance with another embodiment of the present invention. As shown in the embodiment of FIG. 7, processor 700 includes multiple domains. Specifically, a core domain 710 can include a plurality of cores $710_0$-$710_n$, a graphics domain 720 can include one or more graphics engines (e.g., GPU), and a system agent domain 750 may further be present. Note that additional domains can be present in other embodiments. For example, multiple core domains may be present each including at least one core.

In general, each core $710_i$ may further include low level caches in addition to various execution units and additional processing elements. The various cores may be coupled to each other and to a shared cache memory formed of a plurality of units of a lower level cache (LLC) $740_0$-$740_n$. In various embodiments, LLC $740_0$-$740_n$ may be shared amongst the cores and the graphics engine, as well as various media processing circuitry. As seen, a ring interconnect 730 couples the cores together, and provides interconnection between the cores 710, graphics processing unit (GPU) 720, and system agent circuitry 750. The graphics domain 720 may be coupled with a graphics memory 760. A core, e.g., core $710_0$ may execute a set of chained APIs, and one or more of the APIs may initiate a respective task, e.g., subroutine call to the GPU in the graphics domain 720. One or more of the subroutine calls GRi may have an argument (e.g., input argument, output argument) that includes a token, in accordance with embodiments of the present invention. As a result of the token in the output argument, intermediate data that is output may be stored in the graphics memory 760, and not transferred to be stored in a system memory 790, in accordance with embodiments of the present invention. Further, in accordance with embodiments of the present invention, when the output argument of the subroutine being executed by the GPU includes a token the core may execute setup instructions for a subsequent task to be executed by a GPU while the GPU executes a current task, e.g., the processor executes setup instructions in parallel with the GPU execution of the current task. Additionally, a task with an input argument that includes a token may cause input data to load from the graphics memory 760 (e.g., output from a previous task) instead of from the system memory 790, in accordance with embodiments of the present invention.

As further seen, system agent domain 750 may include a power control unit (PCU) 756 to perform power management operations for the processor. Processor 700 can further include an integrated memory controller (IMC) 770 that can provide for an interface to a system memory, such as a dynamic random access memory (DRAM). Multiple interfaces $780_0$-$780_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with the QPI™ protocol may also be provided. Although shown at this high level in the embodiment of FIG. 7, understand the scope of the present invention is not limited in this regard.

Figure 8:
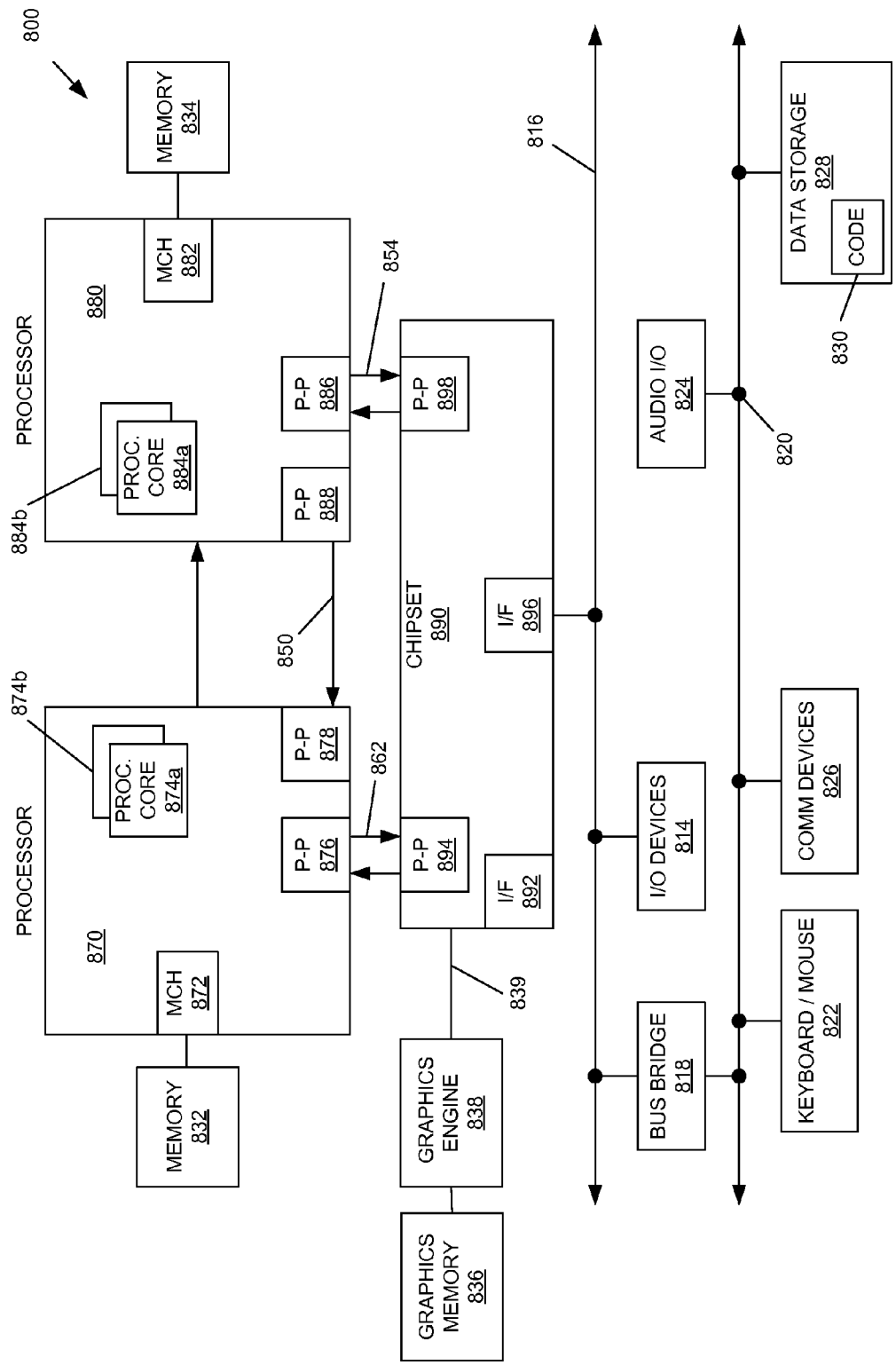
FIG. 8 is a block diagram of another system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (e.g., processor cores 874*a* and 874*b*, and processor cores 884*a* and 884*b*), although potentially many more cores may be present in the processors.

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCHs 872 and 882 couple the processors to respective memories, namely a memory 832 and a memory 834, which may be portions of system memory (e.g., DRAM) locally attached to respective processors. First processor 870 and second processor 880 may be coupled to a chipset 890 via P-P interconnects 862 and 854, respectively. As shown in FIG. 8, chipset 890 includes P-P interfaces 894 and 898.

Furthermore, chipset 890 includes an interface 892 to couple chipset 890 with a graphics engine 838 (e.g., GPU) by a P-P interconnect 839. The graphics engine 838 may be coupled to a graphics memory 836. In some embodiments, the graphics memory 836 is distinct from memory 832 or memory 834. One of the processors (e.g., 870 or 880) may execute a set of chained APIs including APIs that call for tasks to be executed by the graphics engine 838, in accordance with embodiments of the present invention. One or more of the tasks to be executed on the graphics engine 838 may be a subroutine that includes a token in an output argument of the subroutine. Responsive to the output argument including the token, the output of the subroutine may be stored in the graphics memory 838 instead of in memory 832 or 834, in accordance with some embodiments of the present invention. The set of chained tasks may each have a token in either an input or an output argument, and as a result, data may be retrieved from, or stored in, the graphics memory 836 in accordance with embodiments of the present invention. Further, the processor (e.g., 870) may execute setup instructions for a next task to be executed by the graphics engine 838 while the graphics engine 838 executes a current task that has a token in its output argument, in accordance with embodiments of the present invention.

Chipset 890 may be coupled to a first bus 816 via an interface 896. As shown in FIG. 8, various input/output (I/O) devices 814 may be coupled to first bus 816, along with a bus bridge 818 which couples first bus 816 to a second bus 820. Various devices may be coupled to the second bus 820 including, for example, a keyboard/mouse 822, communication devices 826 and a data storage unit 828 such as a disk drive or other mass storage device that may store code 830, in one embodiment. Further, an audio I/O 824 may be coupled to second bus 820. Embodiments can be incorporated into other types of systems including mobile devices such as a smart cellular telephone, tablet computer, netbook, Ultrabook™, or so forth.

Other embodiments are described below. Examples can include subject matter such at least one machine-readable medium including instructions that, when performed by a machine cause the machine to perform acts of a method, the method, means for performing acts of the method or of an apparatus or system to execute a set of chained tasks, according to embodiments and examples described herein.

In example 1, at least one computer readable storage medium has instructions stored thereon for causing a system to send, from a processor to a task execution device, a first call to execute a first subroutine of a set of chained subroutines. The first subroutine may have a first subroutine output argument that includes a first token to indicate that first output data from execution of the first subroutine is intermediate data of the set of chained subroutines. Also included are instructions to enable the processor to execute one or more operations while the task execution device executes the first subroutine responsive to inclusion of the first token in the first subroutine output argument.

Example 2 includes the elements of example 1, and further includes instructions to cause the task execution device to store the first output data in a first portion of a secondary memory coupled to the task execution device and to refrain from sending the first output data to the processor.

Example 3 includes the subject matter of example 2, and further includes instructions to send a second call from the processor to the task execution device to execute a second subroutine having a second subroutine input argument that includes the first token and that causes the task execution device to execute the second subroutine on the first output data stored at the first portion of the secondary memory, and to output second output data.

Example 4 includes the subject matter of example 3, and further includes instructions to receive, by the processor, the second output data from the task execution device responsive to the second subroutine having a second subroutine output argument without tokens indicating that the second output data is not intermediate data.

Example 5 includes the subject matter of example 3, and where the second subroutine includes an output argument that includes a second token to indicate that the second output data is intermediate data to be stored in the secondary memory.

Example 6 includes the subject matter of example 1, and further includes instructions to send input data to the task execution device responsive to the first subroutine having a first subroutine input argument that indicates that the input data is not intermediate data.

Example 7 includes the subject matter of any one of examples 1 to 6, and further includes instructions to cause the processor to refrain from execution of an operation while the task execution device executes a particular subroutine responsive to an absence of tokens in an output argument of the particular subroutine.

Example 8 is a system that includes a processor and a system memory coupled to the processor. The processor includes a first core to issue to a task execution device a first subroutine call to execute a first subroutine having a first output argument that includes a first token to indicate that first output data from execution of the first subroutine is intermediate data for a chain of subroutines that includes the first subroutine. The core is also to execute one or more instructions while the task execution device executes the first subroutine responsive to inclusion of the first token in the first output argument.

Example 9 includes the subject matter of example 8, and also includes the task execution device that is coupled to the processor and coupled to a secondary memory distinct from the system memory. The task execution device is to execute the first subroutine on first input data and output the first output data, and also to store the first output data in a first portion of the secondary memory and refrain from transmission of the first output data to the processor responsive to the first token being included in the first output argument.

Example 10 includes the subject matter of example 9. The processor is further to issue to the task execution device a second subroutine call to execute a second subroutine with the first output data as input responsive to the second subroutine having a second subroutine input argument that includes the first token.

Example 11 includes the subject matter of claim 10, and responsive to the second subroutine having a second subroutine output argument that includes a second token, the task execution device is to store second output data associated with execution of the second subroutine, in a second portion of the secondary memory. The task execution device is to refrain from transmission of the second output data to the processor.

Example 12 includes the subject matter of example 11. Additionally, the processor is to set up and issue to the task execution device a third subroutine call to execute a third subroutine with input to the third subroutine being the second output data, responsive to the third subroutine having a third subroutine input argument that includes the second token.

Example 13 includes the subject matter of claim 12, and further the task execution device is to output third output data to the processor responsive to inclusion of a pointer in an output argument of the third subroutine. The pointer is to indicate that the third output data is to be sent to the processor.

Example 14 includes the subject matter of any of examples 9-13, where for each subroutine that has a corresponding token in a respective output argument of the subroutine, the processor is configured to execute one or more operations while the subroutine is being executed on the task execution device.

Example 15 is a method including sending, by a processor to a task execution unit, a first task call to execute a first task. The first task call includes a first task output argument that includes a first token. The method also includes, responsive to inclusion of the first token in the first task output argument, performing, by the processor, one or more setup operations associated with a second task while the task execution unit executes the first task.

Example 16 includes the subject matter of example 15, and further includes sending by the processor to the task execution unit a second task call with a second task input argument that includes the first token to cause the task execution unit to execute the second task on first output data associated with execution of the first task by the task execution unit.

Example 17 includes the subject matter of example 15, and further includes storing first output data associated with the execution of the first task on a secondary memory coupled to the task execution unit, and refraining from transmitting the first output data to the processor.

Example 18 includes the subject matter of example 15, and includes sending by the processor to the task execution unit a second task call with a second task input argument including the first token to cause the task execution unit to execute the second task on the first output data.

Example 19 includes the subject matter of example 18, where the second task call has an associated second task output argument that includes a second token that identifies a second portion of a secondary memory. The second portion of the secondary memory is to store second output data associated with execution of the second task by the task execution unit.

Example 20 includes the subject matter of example 19, and also includes sending by the processor to the task execution unit a third task call with a third task output argument that includes an output pointer, and receiving, by the processor, third output data from the task execution unit responsive to execution by the task execution unit of the third task. The output pointer is to indicate that the third output data is to be output to the processor.

Example 21 is an apparatus to perform a method as in any one of examples 15-20.

Example 22 is a processor including one or more cores to couple to a system memory. The cores include a first core to transmit first data to a GPU, and to execute a first application programming interface (API) that includes a first call to the GPU to execute a first task that is to include a first task output argument that includes a first token. The first token indicates that first output data from execution of the first task is to be input to a second task to be executed by the GPU. Responsive to the first task output argument including the first token, the first core is to execute setup operations while the GPU executes the first task. The setup operations are associated with execution of the second task by the GPU.

Example 23 includes the subject matter of example 22. Additionally, the processor is to execute a second API that includes a second call to execute the second task by the GPU. The second task includes a second task input argument that includes the first token to indicate that the first output data is to be input data for the second task.

Example 24 includes the subject matter of example 22, and optionally includes the subject matter of example 23. The first core is further to receive second output data from execution of the second task by the GPU responsive to an output argument of the second task including a target pointer that indicates that the second output data is to be sent to the first core.

Example 25 includes the subject matter of either or both of examples 23 and 24. Additionally, for each API executed by the first core that includes a call to execute a corresponding task by the GPU, where the task includes a respective token in an output argument of the task to indicate that that respective output data from execution of the task is intermediate data in a set of chained tasks of the GPU, while the GPU executes the corresponding task the processor is to execute setup operations associated with a respective task to be executed subsequent to the corresponding task.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory computer readable storage medium having instructions stored thereon for causing a system to:
   send, from a processor to a task execution device, a first call to execute a first subroutine of a set of chained subroutines, the first subroutine having a first subroutine output argument that includes a first token to indicate that first output data from execution of the first subroutine is intermediate data of the set of chained subroutines; and
   enable the processor to execute one or more operations while the task execution device executes the first subroutine responsive to inclusion of the first token in the first subroutine output argument.

2. The at least one non-transitory computer readable storage medium of claim 1, further comprising instructions to cause the task execution device to store the first output data in a first portion of a secondary memory coupled to the task execution device and to refrain from sending the first output data to the processor.

3. The at least one non-transitory computer readable storage medium of claim 2, further comprising instructions to send a second call from the processor to the task execution device to execute a second subroutine having a second subroutine input argument that includes the first token and that causes the task execution device to execute the second subroutine on the first output data stored at the first portion of the secondary memory and to output second output data.

4. The at least one non-transitory computer readable storage medium of claim 3, further comprising instructions to receive, by the processor, the second output data from the task execution device responsive to the second subroutine having a second subroutine output argument without a token, which indicates that the second output data is not intermediate data.

5. The at least one non-transitory computer readable storage medium of claim 3, wherein the second subroutine includes an output argument that includes a second token to indicate that the second output data is intermediate data to be stored in the secondary memory.

6. The at least one non-transitory computer readable storage medium of claim 3, further comprising instructions to cause the processor to refrain from execution of an operation while the task execution device executes the second subroutine responsive to an absence of any token in an output argument of the second subroutine.

7. The at least one non-transitory computer readable storage medium of claim 1, further comprising instructions to send input data to the task execution device responsive to the first subroutine having a first subroutine input argument that indicates that the input data is not intermediate data.

8. A system comprising:
a processor including a first core to:
issue to a task execution device a first subroutine call to execute a first subroutine having a first output argument that includes a first token to indicate that first output data from execution of the first subroutine is intermediate data for a chain of subroutines that includes the first subroutine; and
execute one or more instructions while the task execution device executes the first subroutine responsive to inclusion of the first token in the first output argument; and
a system memory coupled to the processor.

9. The system of claim 8, further comprising the task execution device, wherein the task execution device is coupled to the processor and coupled to a secondary memory distinct from the system memory, the task execution device to:
execute the first subroutine on first input data and output the first output data; and
store the first output data in a first portion of the secondary memory and refrain from transmission of the first output data to the processor responsive to the first token being included in the first output argument.

10. The system of claim 9, wherein the processor is to issue to the task execution device a second subroutine call to execute a second subroutine with the first output data as input responsive to the second subroutine having a second subroutine input argument that includes the first token.

11. The system of claim 10, wherein responsive to the second subroutine having a second subroutine output argument that includes a second token, the task execution device is to store second output data, associated with execution of the second subroutine, in a second portion of the secondary memory, and the task execution device is to refrain from transmission of the second output data to the processor.

12. The system of claim 11, wherein the processor is to set up and issue to the task execution device a third subroutine call to execute a third subroutine with input to the third subroutine being the second output data responsive to the third subroutine having a third subroutine input argument that includes the second token.

13. The system of claim 12, wherein the task execution device is to output third output data to the processor responsive to inclusion of a pointer in an output argument of the third subroutine, wherein the pointer is to indicate that the third output data is to be sent to the processor.

14. The system of claim 11, wherein the processor is configured to execute one or more operations while the second subroutine is being executed on the task execution device responsive to the second subroutine output argument including the second token.

15. A method comprising:
sending, by a processor to a task execution unit, a first task call to execute a first task, wherein the first task call includes a first task output argument that includes a first token; and
responsive to inclusion of the first token in the first task output argument, performing, by the processor, one or more setup operations associated with a second task while the task execution unit executes the first task.

16. The method of claim 15, further comprising sending by the processor to the task execution unit a second task call with a second task input argument that includes the first token to cause the task execution unit to execute the second task on first output data associated with execution of the first task by the task execution unit.

17. The method of claim 15, further comprising storing first output data associated with the execution of the first task, on a secondary memory coupled to the task execution unit, and refraining from transmitting the first output data to the processor.

18. The method of claim 15, further comprising sending by the processor to the task execution unit a second task call with a second task input argument including the first token to cause the task execution unit to execute the second task on the first output data.

19. The method of claim 18, wherein the second task call has an associated second task output argument that includes a second token that identifies a second portion of a secondary memory, the second portion to store second output data associated with execution of the second task by the task execution unit.

20. The method of claim 19, further comprising sending by the processor to the task execution unit a third task call with a third task output argument that includes an output pointer, and receiving, by the processor, third output data from the task execution unit responsive to execution by the task execution unit of the third task, wherein the output pointer is to indicate that the third output data is to be output to the processor.

* * * * *